United States Patent
Vichniakov

(10) Patent No.: US 12,145,323 B2
(45) Date of Patent: Nov. 19, 2024

(54) TRANSMISSION WELDING METHOD, TRANSMISSION WELDING DEVICE AND TRANSMISSION WELDING ARRANGEMENT

(71) Applicant: Airbus Operations GmbH, Hamburg (DE)

(72) Inventor: Alexei Vichniakov, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/582,348

(22) Filed: Jan. 24, 2022

(65) Prior Publication Data

US 2022/0203626 A1 Jun. 30, 2022

Related U.S. Application Data

(63) Continuation of application No. PCT/EP2020/067171, filed on Jun. 19, 2020.

(30) Foreign Application Priority Data

Jul. 30, 2019 (DE) ...................... 10 2019 120 595.6

(51) Int. Cl.
*B29C 65/14* (2006.01)
*B29C 65/00* (2006.01)
(Continued)

(52) U.S. Cl.
CPC ...... *B29C 65/1435* (2013.01); *B29C 65/1416* (2013.01); *B29C 65/1419* (2013.01);
(Continued)

(58) Field of Classification Search
CPC ............ B29C 65/1435; B29C 65/1416; B29C 65/1419; B29C 66/1142; B29C 66/721; B29C 66/7392; B29C 66/81267
See application file for complete search history.

(56) References Cited

U.S. PATENT DOCUMENTS 3,477,194 A 11/1969 Corrsin
5,949,959 A * 9/1999 Lovett ................. B29C 65/1435
392/407

(Continued)

FOREIGN PATENT DOCUMENTS

CA 2317366 A1 * 3/2001 ............ B23K 20/12
DE 195 10 493 A1 10/1995
(Continued)

OTHER PUBLICATIONS

German Search Report for Application No. 102019120595 dated Mar. 10, 2020.
(Continued)

*Primary Examiner* — Daniel McNally
(74) *Attorney, Agent, or Firm* — KDW Firm PLLC

(57) ABSTRACT

To achieve universal welding of thermoplastic workpiece parts with simple equipment, an infrared light transmission welding method is disclosed in which simple polychromatic, incoherent infrared light is generated by a simple infrared light source and is directed through a first workpiece part to a weld point for the purposes of connection to a second workpiece part. In particular, the infrared light is directed through a transparent bracing element.

18 Claims, 10 Drawing Sheets

(51) Int. Cl.
*B29C 65/78* (2006.01)
*B29L 31/30* (2006.01)

(52) U.S. Cl.
CPC ...... *B29C 65/7841* (2013.01); *B29C 66/0044* (2013.01); *B29C 66/0242* (2013.01); *B29C 66/034* (2013.01); *B29C 66/0342* (2013.01); *B29C 66/1122* (2013.01); *B29C 66/1142* (2013.01); *B29C 66/43* (2013.01); *B29C 66/721* (2013.01); *B29C 66/7392* (2013.01); *B29C 66/81267* (2013.01); *B29C 66/9241* (2013.01); *B29L 2031/3076* (2013.01); *B29L 2031/3082* (2013.01)

(56) References Cited

U.S. PATENT DOCUMENTS

| | | | |
|---|---|---|---|
| 2002/0088777 A1* | 7/2002 | Grewell | B23K 26/702 219/121.63 |
| 2003/0094240 A1* | 5/2003 | Sarmiento | B29C 66/1222 156/380.9 |
| 2006/0134994 A1* | 6/2006 | Yasuda | B29C 65/1654 439/676 |
| 2006/0144509 A1* | 7/2006 | Hofmann | B29C 66/8362 156/304.6 |
| 2009/0056865 A1* | 3/2009 | Kubota | B29C 65/1416 524/413 |

FOREIGN PATENT DOCUMENTS

| | | |
|---|---|---|
| DE | 694 14 951 T2 | 7/1999 |
| DE | 10 2005 004404 A1 | 8/2006 |
| DE | 10 2009 043376 A1 | 4/2011 |
| EP | 2 108 502 A1 | 10/2009 |
| GB | 2276584 A | 10/1994 |
| WO | WO 9802294 A2 | 1/1998 |
| WO | WO 2019/053086 A1 | 3/2019 |

OTHER PUBLICATIONS

International Search Report for Application No. PCT/EP2020/067171 dated Sep. 15, 2020.

Potente, H. et al,"Comparative investigation into welding of glass-fibre reinforced PES," Journal of Composite Materials, vol. 6, No. 2, pp. 147-159. Apr. 1993.

* cited by examiner

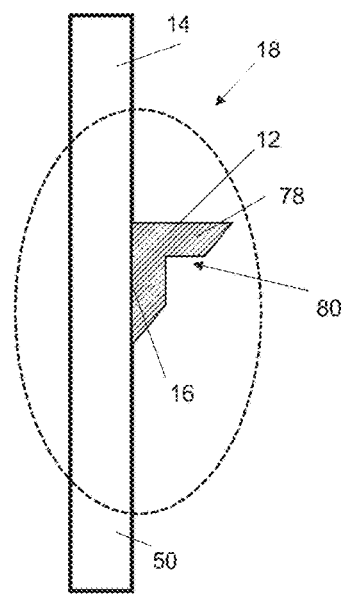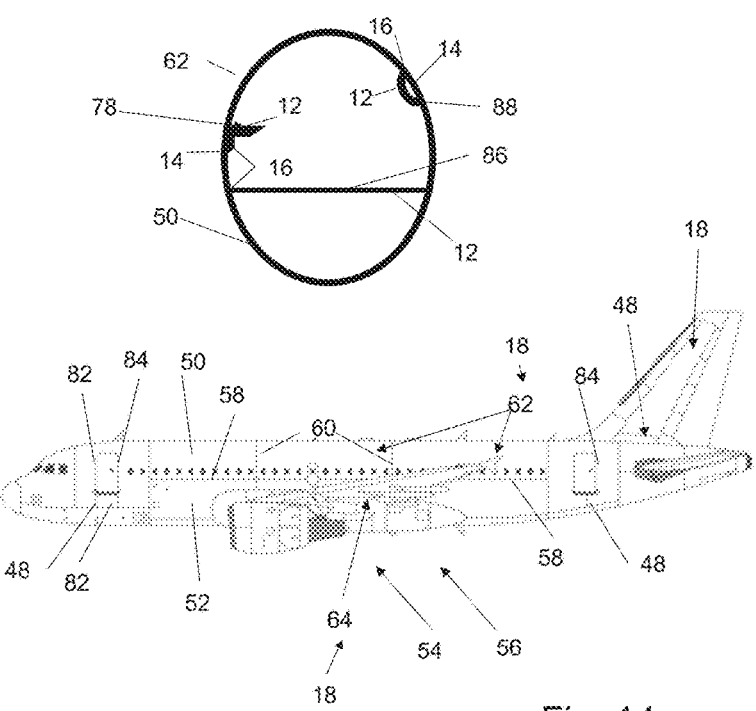

TRANSMISSION WELDING METHOD, TRANSMISSION WELDING DEVICE AND TRANSMISSION WELDING ARRANGEMENT

CROSS-REFERENCE TO RELATED APPLICATIONS

This application is a continuation of and claims priority to Application No. PCT/EP2020/067171 filed Jun. 19, 2020, which claims priority to German Patent Application No. 10 2019 120 595.6 filed Jul. 30, 2019, the entire disclosures of which are incorporated by reference herein.

TECHNICAL FIELD

The disclosure herein relates to a transmission welding method for welding a first workpiece part, which is formed at least partially from thermoplastic material, to at least one second workpiece part at a weld point. The disclosure herein further relates to various alternative uses of such a transmission welding method, in particular in the course of the production of an aircraft. The disclosure herein furthermore relates to a transmission welding apparatus for welding a first workpiece part, which is formed at least partially from thermoplastic material, to at least one second workpiece part at a weld point. The disclosure herein furthermore relates to a transmission welding arrangement that comprises such a transmission welding apparatus and the first and the second workpiece. Finally, the disclosure herein relates to a vehicle, in particular an aircraft and more particularly an airplane, having a workpiece or a connection that can be produced by the transmission welding method or by the transmission welding apparatus.

BACKGROUND

In the production of connections in aircraft structural components, in particular the fuselage of an aircraft or the like, it is predominantly the case in practice that bolts and rivets are inserted into correspondingly manufactured holes.

Refinements of the disclosure herein make use of connecting techniques and structures producible therewith, which structures are producible with less outlay than the connection techniques or structures hitherto used, are lighter in weight and are nevertheless intended to provide at least comparable or improved reliability.

Because of the low weight and the good adaptability to load conditions, efforts are being made to make increasing use of components composed of fiber composite materials, in particular with a thermoplastic matrix, in vehicle construction and in aircraft construction. It is already known in principle to connect a workpiece composed of a first workpiece composed of thermoplastic fiber composite material and of a second workpiece composed of thermoplastic fiber composite material by welding.

For example, the literature reference,

[1] Potente, H. et al., 1993, "Comparative investigation into the welding of glass-fibre reinforced PES"; Journal of Thermoplastic Composite Materials, Vol. 6, No 2, pp 147-159, describes a connection of workpiece parts composed of thermoplastic fiber composite material by infrared welding, wherein the connection surfaces are irradiated with infrared light by infrared lamps before then being pressed against one another.

The literature reference [2] DE 10 2009 043 376 A1 discloses the joining of workpiece parts formed at least partially from thermoplastic material by laser welding.

The literature reference [3] WO 2019/053086 A1 discloses the joining of workpiece parts formed from thermoplastic material by conduction welding.

SUMMARY

The disclosure herein is based on the object of enabling workpiece parts formed at least partially from thermoplastic material to be welded more universally and with less setup in terms of equipment and processes.

To achieve this object, the disclosure herein provides a transmission welding method. Uses of the transmission welding method, a transmission welding apparatus, in particular for carrying out the transmission welding method, and a transmission welding arrangement, in particular for carrying out the transmission welding method, and a vehicle, in particular aircraft, having a workpiece formed therewith or a connection produced therewith are disclosed herein.

The disclosure herein, according to a first aspect thereof, provides a transmission welding method for welding a first workpiece part, which is formed at least partially from thermoplastic material, to at least one second workpiece part at a weld point, comprising:

directing polychromatic, incoherent infrared light radiation through the first workpiece part to the weld point.

Preferably, in the transmission welding method, at least the first workpiece part and the second workpiece part are welded at a connection region in order to thus form a workpiece.

It is preferred that at least one region of the first workpiece part or the entire first workpiece part is formed from a thermoplastic fiber composite material and in that the infrared light radiation is directed through the fiber composite material to the weld point.

The transmission welding method preferably comprises the step:

generating the polychromatic, incoherent infrared light radiation by an infrared lamp.

The transmission welding method preferably comprises the step:

generating the infrared light radiation in a wavelength range from 1.0 to 3.0 µm, preferably from 1.2 to 3.0 µm.

The transmission welding method preferably comprises the step:

generating infrared light radiation as IR-B radiation according to DIN5031.

The transmission welding method preferably comprises the step:

moving the infrared light radiation over the first workpiece part in order to weld the workpiece parts continuously along a welding region.

The transmission welding method preferably comprises the step:

moving an infrared light source generating the infrared light radiation over the first workpiece part in order to weld the workpiece parts continuously along a welding region.

The transmission welding method preferably comprises the steps:

a) bracing the first workpiece part and the second workpiece part by at least one bracing element which is at least partially transparent to the infrared light radiation, and b) directing the infrared light radiation through the bracing element to the first workpiece part.

It is preferred that step a) comprises:

a1) pressing the bracing element onto the first workpiece part.

It is preferred that step a) comprises:

a2) using a bracing element composed of a material selected from the group of materials which comprises a material transparent to the infrared light radiation, a flexible material, a rigid material, glass, transparent plastic, polyimide, vacuum packaging film and silicone, and combinations of these materials.

It is preferred that step a) comprises:

a3) using a pressure plate or bracing jaw as bracing element.

It is preferred that step a) comprises:

a4) using a bracing element having at least one fluid medium cavity filled or fillable with a fluid medium.

It is preferred that step a) comprises:

a5) using a flexible bracing element and controlling the contact pressure of the flexible bracing element by a pressure fluid.

It is preferred that step a) comprises:

a6) moving the bracing element (26) over the first workpiece part (12).

It is preferred that step a) comprises:

a7) using a bracing element (26) that is rotatable about an axis of rotation.

It is preferred that step a) comprises:

a8) using a bracing element (26) which is roll-shaped, roller-shaped or spherical or in the form of a rolling body.

It is preferred that step a) comprises:

a9) rolling the bracing element (26) over the first workpiece part (12).

It is preferred that step a) comprises:

a10) generating the infrared light radiation (32) in the interior of the bracing element (26) in the form of a rolling body.

It is preferred that step a) comprises:

a11) moving an infrared light source and the bracing element (26) jointly over the first workpiece part.

It is preferred that step a) comprises:

a12) using a bracing element which has multiple rigid segments, which are preferably flexibly articulated to one another, in order to replicate the topology of the first workpiece part.

The transmission welding method preferably comprises the step:

c) setting a temperature of the bracing element before, during and/or after step b) in order to influence the temperature of at least one region of the workpiece.

It is preferable if at least one of steps a) or c), in particular at least one of steps a1)-a12), more particularly a4), a5), in particular in conjunction with step c), comprises the step:

using a bracing element with at least one channel and conducting a temperature-controlled fluid medium through the at least one channel.

It is preferable if least one of steps a) or c), in particular at least one of steps a1)-a12), more particularly a4), a5), in particular in conjunction with step c), comprises the step:

conducting a fluid medium that is transparent or transmissive to the infrared light radiation through the bracing element.

It is preferable if at least one of steps a) or c), in particular at least one of steps a1)-a12), more particularly a4), a5), in particular in conjunction with step c), comprises the step:

preheating the bracing element and the workpiece in order to reduce the heating time for the welding process.

It is preferable if at least one of steps a) or c), in particular at least one of steps a1)-a12), more particularly a4), a5), in particular in conjunction with step c), comprises the step:

postheating or cooling the bracing element and the workpiece in order to improve the workpiece quality or the crystallization rate.

It is preferable if at least one of steps a) or c), in particular at least one of steps a1)-a12), more particularly a4), a5), in particular in conjunction with step c), comprises the step:

controlling a pressure distribution by controlling the pressure of the fluid medium.

The transmission welding method preferably comprises the step:

welding the material parts, in each case selected from the group comprising a fiber-reinforced plastics component, a component with a matrix composed of thermoplastic material, a component with a matrix composed of PPS, a component with a matrix composed of PEKK, a component with a matrix composed of PEEK, a component with a matrix composed of PA, a component with a matrix composed of PEI, a component with a matrix composed of LM PAEK, a component with a matrix composed of FBI, a component with a matrix composed of PE, a component with reinforcement fibers in the form of a woven fabric, a component with reinforcement fibers in the form of a scrim, a component with reinforcement fibers in the form of unidirectional fibers, a component with reinforcement fibers in the form of short fibers, a component with reinforcement fibers in the form of continuous fibers, a component with reinforcement fibers composed of carbon, a component with reinforcement fibers composed of glass, a component with reinforcement fibers composed of continuous carbon fibers, a component with reinforcement fibers composed of continuous glass fibers; a component with reinforcement fibers composed of short carbon or glass fibers, a component with reinforcement fibers composed of aramid fibers, a component with reinforcement fibers composed of silk, a component with reinforcement fibers composed of fibers from a biological source, a component with reinforcement fibers composed of ceramic.

The transmission welding method preferably comprises the step:

welding the first workpiece part and the second workpiece part with an overlap or partial overlap.

The transmission welding method preferably comprises the step:

welding the first workpiece part and the second workpiece part with a butt joint.

The transmission welding method preferably comprises the step:

introducing an intermediate layer between the workpiece parts before the welding process.

The transmission welding method is preferably used for generating longitudinal and/or circumferential connections on a vehicle or aircraft fuselage or component.

The transmission welding method is preferably used for welding fastening elements, clips, brackets, clamps or clips to a fuselage structure or skin of a vehicle or aircraft.

The transmission welding method is preferably used for welding a frame of a vehicle or aircraft.

The transmission welding method is preferably used for welding a skin to a frame on a vehicle or aircraft.

The transmission welding method is preferably used for welding stringers or formers to a skin of a vehicle or aircraft.

The transmission welding method is preferably used for welding structural components to form an enclosure for a door of a vehicle or aircraft.

The transmission welding method is preferably used for welding floor structures of a vehicle or aircraft.

The transmission welding method is preferably used for welding coupling elements for coupling structural elements of a vehicle or aircraft.

The transmission welding method is preferably used for welding a window frame to a skin of a vehicle or aircraft.

The transmission welding method is preferably used for welding a reinforcement structure to a structural component of a vehicle or aircraft.

The disclosure herein or its refinements could also be implemented or used in other structures, for example in land vehicles, ships, buildings, technical structures composed of thermoplastic materials. Also, in aircraft, the disclosure herein or its refinements may be used not only in airplanes but also in helicopters, drones, flying cars, flying taxis and in rockets and satellites.

According to a further aspect, the disclosure herein provides a transmission welding apparatus for welding a first workpiece part, which is formed at least partially from thermoplastic material, to at least one second workpiece part at a weld point, to form a workpiece, comprising:
  an infrared light source for generating a polychromatic, incoherent infrared light radiation, and
  a bracing element which is at least partially transparent to the infrared light radiation and which has a bracing surface for bracing the workpiece parts,
  wherein the infrared light source is arranged on a side situated opposite the bracing surface and is designed to direct the infrared light radiation through the bracing element onto the workpiece.

The transmission welding apparatus is preferably designed for carrying out the transmission welding method and/or its advantageous uses in accordance with one of the refinements described above.

In particular, the bracing element is designed to brace the first workpiece part on or against the second workpiece part. The workpiece has at least the first and the second workpiece part, which are to be welded to one another by the transmission welding apparatus. The infrared light radiation from the infrared light source can be directed through the bracing element onto the workpiece. In particular, the transmission welding apparatus is designed such that the infrared light radiation from the infrared light source can be directed through the bracing element onto the first workpiece part, there is directed at least partially by transmission to the weld point, and causes material at the weld point to fuse.

It is preferred that the infrared light source has at least one infrared lamp.

It is preferred that the infrared light source is designed to generate the infrared light radiation in a wavelength range of 1.0 to 3.0 μm.

It is preferred that the infrared light source is designed to generate the infrared light radiation as IR-B radiation according to DIN5031.

The transmission welding apparatus preferably has at least one movement device for moving the infrared light source and/or the bracing element.

The transmission welding apparatus preferably has a bracing device that has the bracing element, a counterpart bracing element and a bracing force generating device. The bracing device is preferably designed such that the workpiece can be braced between the bracing element and the counterpart bracing element and, in the process, the workpiece parts can be subjected to mechanical pressure loading. For this purpose, the bracing force generating device is preferably configured to move the bracing element against the counterpart bracing element with a bracing force.

It is preferred that the infrared light source can be moved by the movement device relative to the counterpart bracing element, which is designed to exert an opposing bracing force for the purposes of bracing the workpiece between the bracing element and the counterpart bracing element.

It is preferred that the infrared light source is arranged in the interior of the bracing element in the form of a rolling body.

It is preferred that the bracing element has at least one fluid channel or fluid cavity for a fluid medium.

It is preferred that the bracing element is formed from a flexible and/or from a rigid material.

It is preferred that the bracing element is formed at least partially from glass, silicone or polyimide or a vacuum packaging film.

It is preferred that the bracing element is in the form of a bracing jaw or pressure plate.

It is preferred that the bracing element has at least one flexible skin region for bearing against the workpiece.

It is preferred that the bracing element has at least one or more rigid components and flexible components for bearing against the first workpiece part.

It is preferred that the bracing element is movable over the first workpiece part by the movement device; and/or It is preferred that the bracing element is rotatable about an axis of rotation.

It is preferred that the bracing element is in the form of a rolling body, roller, roll or sphere.

In other words, it is preferred that the bracing element is selected from a group of bracing elements comprising a bracing element with at least one fluid channel or fluid cavity for a fluid medium, a bracing element composed of a flexible material, a bracing element composed of a rigid material, a bracing element composed of glass, a bracing element composed of silicone, a bracing element composed of polyimide, a bracing element composed of vacuum packaging film, a bracing jaw, a pressure plate, a bracing element with a flexible skin region for bearing against the workpiece, a is movable over the workpiece, in particular the first workpiece part, by a movement device while exerting a mechanical pressure, a bracing element rotatable about an axis of rotation, a bracing element in the form of a rolling body, a bracing element in the form of a roller, a bracing element in the form of a roll, a bracing element in the form of a sphere, a bracing element in the interior of which the infrared light source can be arranged, a bracing element that has rigid components and flexible components, a bracing element comprising rigid segments that are flexibly connected to one another, and combinations of such bracing elements.

According to a further aspect, the disclosure herein provides a transmission welding arrangement, comprising a transmission welding apparatus according to any one of the refinements above, a first workpiece part and a second workpiece part to be connected to the first workpiece part at a weld point by welding by the transmission welding apparatus, wherein the first workpiece part is formed from a thermoplastic material, in particular thermoplastic fiber composite material, which is at least partially transparent to the infrared light radiation, and the first workpiece part is arranged such that the infrared light radiation can be directed through the first workpiece part to the weld point.

The first workpiece part is preferably at least partially transparent to the infrared light radiation, that is to say a proportion of the infrared light radiation radiates at least through a major part or the entirety of the first workpiece part. The first workpiece part preferably has a transmittance for the infrared light radiation of at least 1%, preferably at least 3%, more preferably at least 5% and most preferably at least 10%.

It is preferred that the first workpiece part is selected from a group comprising a fiber-reinforced plastics component, a component with a matrix composed of thermoplastic material, a component with a matrix composed of PPS, a component with a matrix composed of PEKK, a component with a matrix composed of PEEK, a component with a matrix composed of PA, a component with a matrix composed of PEI, a component with a matrix composed of LM PAEK, a component with a matrix composed of FBI, a component with a matrix composed of PE, a component with reinforcement fibers in the form of a woven fabric, a component with reinforcement fibers in the form of a scrim, a component with reinforcement fibers in the form of unidirectional fibers, a component with reinforcement fibers in the form of short fibers, a component with reinforcement fibers in the form of continuous fibers, a component with reinforcement fibers composed of carbon, a component with reinforcement fibers composed of glass, a component with reinforcement fibers composed of continuous carbon fibers, a component with reinforcement fibers composed of continuous glass fibers; a component with reinforcement fibers composed of short carbon or glass fibers, a component with reinforcement fibers composed of aramid fibers, a component with reinforcement fibers composed of silk, a component with reinforcement fibers composed of fibers from a biological source, a component with reinforcement fibers composed of ceramic, a structural component for an aircraft, a skin part of an aircraft fuselage, a fastening element or reinforcing element to be fastened to a structure of an aircraft, a clamp, a clip, a cleat, a stringer, a former, a floor element of a floor of an aircraft, and a window frame element or a door frame element of an aircraft.

It is preferred that the second workpiece part is selected from a group comprising a fiber-reinforced plastics component, a component with a matrix composed of thermoplastic material, a component with a matrix composed of PPS, a component with a matrix composed of PEKK, a component with a matrix composed of PEEK, a component with a matrix composed of PA, a component with a matrix composed of PEI, a component with a matrix composed of LM PAEK, a component with a matrix composed of FBI, a component with a matrix composed of PE, a component with reinforcement fibers in the form of a woven fabric, a component with reinforcement fibers in the form of a scrim, a component with reinforcement fibers in the form of unidirectional fibers, a component with reinforcement fibers in the form of short fibers, a component with reinforcement fibers in the form of continuous fibers, a component with reinforcement fibers composed of carbon, a component with reinforcement fibers composed of glass, a component with reinforcement fibers composed of continuous carbon fibers, a component with reinforcement fibers composed of continuous glass fibers; a component with reinforcement fibers composed of short carbon or glass fibers, a component with reinforcement fibers composed of aramid fibers, a component with reinforcement fibers composed of silk, a component with reinforcement fibers composed of fibers from a biological source, a component with reinforcement fibers composed of ceramic, a structural component for an aircraft, a skin part of an aircraft fuselage, a fastening element or reinforcing element to be fastened to a structure of an aircraft, a clamp, a clip, a cleat, a stringer, a former, a floor element of a floor of an aircraft, a window frame element and a door frame element of an aircraft.

According to a further aspect, the disclosure herein provides a vehicle, in particular an aircraft, more particularly an airplane, comprising at least one workpiece that can be produced by a transmission welding method of any one of the preceding refinements.

According to a further aspect, the disclosure herein provides a vehicle, in particular an aircraft, more particularly an airplane, comprising at least one workpiece that can be produced by one of the above uses of the transmission welding method.

According to a further aspect, the disclosure herein provides a vehicle, in particular an aircraft, more particularly an airplane, comprising at least one workpiece that can be produced by a transmission welding apparatus or transmission welding arrangement according to any one of the preceding refinements.

According to a further aspect, the disclosure herein provides a vehicle, in particular an aircraft, more particularly an airplane, comprising at least one weld that can be obtained by a transmission welding method according to any one of the preceding refinements.

According to a further aspect, the disclosure herein provides a vehicle, in particular an aircraft, more particularly an airplane, comprising at least one weld that can be obtained through the use of the transmission welding method in accordance with any one of the preceding refinements.

According to a further aspect, the disclosure herein provides a vehicle, in particular an aircraft, more particularly an airplane, comprising at least one weld that can be obtained by a transmission welding apparatus or a transmission welding arrangement according to any one of the preceding refinements.

The disclosure herein relates to infrared transmission welding.

Infrared welding, in which the contact surfaces to be connected are irradiated with infrared radiation and subsequently pressed together, laser welding, and welding by conduction heat (local co-consolidation), are known in the prior art.

Preferred refinements of the disclosure herein combine the advantages of these methods, but allow a simplified equipment setup and a larger field of application. In this way, welded connections can be made even where they were previously not possible or not economical for technical reasons.

Tests have shown that transmission welding through a workpiece region composed of thermoplastic material, in particular thermoplastic fiber composite material, is possible, and qualitative welded connections can be achieved, even with a relatively simple infrared light source without the use of a laser.

In particular, the disclosure herein relates to apparatuses, methods and arrangements for infrared transmission welding in the case of thermoplastic materials.

In relation to fastening methods with drilled holes and lap and butt joints with bolts or rivets that have hitherto been customary, in particular in the field of aircraft manufacture, embodiments of the disclosure herein yield the advantages of lower complexity of the process chain with a smaller number of steps.

In the embodiments of the disclosure herein, no bores, in particular no bores within a fuselage of a vehicle, in particular aircraft, are necessary. Drilling work, which in some cases has to be carried out under difficult working conditions, is thereby eliminated, with resulting better possibilities for automation.

Because of the elimination of cutting machining work before the connecting process, less dust is generated, and in particular, the accumulation of carbon dust is reduced.

In refinements of the disclosure herein, a sealing connection is obtained as a result, such that additional seals are no longer required for the purposes of hermetic sealing.

In refinements of the disclosure herein, shorter lead times are achieved as a result—in particular in relation to conventional connection techniques in the case of which parts must be aligned by bolt connections with spacers or washers.

In refinements of the disclosure herein, the cutting of fibers in the case of fiber composite materials to be connected to one another is avoided, and there is no risk of delamination.

In the future, thermoplastic materials and thermoplastic technologies will be increasingly used for the construction of lightweight structures, in particular fiber composite structures and more particularly in vehicle construction and aircraft construction.

Thermoplastic materials and technologies offer the possibility of very great changes in the production of aircraft structures and in the arrangement of aircraft structures. Thermoplastic materials that can be welded to one another by the refinements of the disclosure herein allow thermoplastic deformation of elementary components. Main laminates can be laid one on top of the other rapidly. There are very short consolidation cycles, and no clean rooms, freezers or autoclaves are required.

Thermoplastic materials can be welded to one another, such that drilling work can be significantly reduced, expensive fasteners and bolts can be significantly reduced, and further auxiliary materials and also rejects or waste can be significantly reduced.

Accordingly, thermoplastic materials and technologies offer a considerable opportunity to reduce costs for the production and assembly of aircraft, in particular airplanes, and their structure.

Workpiece parts composed of thermoplastic fiber composite materials are particularly preferably welded to one another. The workpiece parts are preferably reinforced with continuous fibers.

Welding thermoplastic materials that are reinforced with through fibers or continuous fibers is a particularly advantageous connection process. The connection is preferably made by welding with the application of heat and pressure. More particularly, the welding may be performed with or without the use of filler materials or auxiliary materials in the welding region.

Welding of thermoplastic materials is particularly preferably performed. Welding refers in particular to a connecting process in which two or more parts are joined together to form a workpiece, wherein a continuity in the composition of the workpiece material is generated through the application of heat or pressure or both. This may be performed with the use of filler material or without the use of filler material.

In the refinements of the disclosure herein, by contrast to previously known infrared welding methods, infrared radiation is directed through a region of the workpiece formed from the workpiece parts that are to be connected to one another. The infrared radiation passes through the region to the weld point. The workpiece parts can thus be pressed against one another before the welding process, and are subsequently irradiated with infrared light radiation. Thus, an infrared light source can be arranged at the outside, and a far greater number of connections can be produced economically by such a welding method than with the previously known infrared welding technology.

In particular, at the weld point, local heating can be achieved at the weld point by virtue of pressure being applied and infrared radiation then being directed through, such that macromolecular interdiffusion up to complete diffusion of the macromolecules of the two welding partners can be achieved at the weld point.

In relation to laser welding methods, there is the advantage that infrared light sources with particularly preferred wavelength ranges in which thermoplastic materials to be welded exhibit particularly good transmissivity are easy and inexpensive to obtain. The infrared light sources for generating the infrared light radiation according to the disclosure herein can be obtained at far lower cost than lasers and are easier to transport and easier to handle.

In one advantageous refinement of the infrared transmission welding method, the workpiece parts to be connected to one another are positioned relative to one another in a clamping apparatus. A first part of the clamping apparatus—hereinafter referred to as bracing element—should be transparent to the infrared light radiation. In some refinements of the disclosure herein, this first part of the clamping apparatus—bracing element—is flexible.

In some refinements, an additional layer is introduced between the workpiece parts that are to be connected to one another. The additional layer may for example be a matrix layer or a functional layer—for example metal lattice, layer with conductor tracks, layer for improving fusion, etc. Such a layer could also already be integrated into one of the workpiece parts.

It is preferable for a mechanical pressure to be exerted on the arrangement composed of the first workpiece part and a second workpiece part by the clamping devices of the clamping apparatus—in particular the bracing element and a counterpart bracing element, such as a fixed support. This arrangement, and also the product obtained as a result of the welding, will also be referred to below as the workpiece.

An infrared heating source is preferably placed over the infrared-transparent bracing element. In another refinement, in particular a refinement in which the bracing element is in the form of a rolling body, the infrared light source is provided in the bracing element. For example, the bracing element surrounds the infrared light source and is rotatably suspended such that it is movable by rolling over the first workpiece.

Infrared heating is used as a through-heating source and passes through the transparent bracing element to the first workpiece part.

The infrared heating heats the first workpiece part. This may also take place partly as surface heating and partly as infrared light radiation that penetrates the first workpiece part by transmission. The heating energy is thus directed to the weld point—connection region—and into the second workpiece.

The energy of the infrared heating leads to heating of the connection region—weld point—to the point of melting of the first workpiece and possibly of the connection region of the second workpiece or of the additional layer in this region.

In some refinements, infrared transmission welding is carried out with heating assistance from a fluid medium. Heating assistance from a fluid medium can be implemented in particular by virtue of at least one of the parts of a clamping apparatus having one or more channels for the fluid medium.

Fluid medium can be provided in these channels during the welding process for the purposes of improving the temperature and pressure distribution. In some refinements, a liquid medium is conducted through the at least one channel, and in some refinements, the fluid medium is in the form of a gas, for example in the form of compressed air or heating air or cooling air.

If the transparent bracing element has such fluid medium channels, it is advantageous if the fluid medium is transparent and/or transmissive to infrared light. Liquid fluid media suitable for this purpose are for example oils that are resistant to high temperatures, or water.

The temperature of the fluid medium is preferably controlled. In particular, a cooling device and/or heating device for cooling and/or heating the fluid medium may be provided in an infrared transmission welding apparatus according to a refinement of the disclosure herein.

Control of the temperature of this fluid medium makes it possible, for example, to reduce the heating time by preheating fluid medium or to reduce the welding time by additionally heating the fluid medium and/or to provide better consolidation or crystallization through subsequent temperature control, in particular postheating or control of the cooling rate.

In particular if the bracing element is formed at least partially from flexible material, for example silicone or polyimide, such as Kapton®, an application of pressure on the workpiece can be controlled by a fluid medium that is conducted with a controlled pressure through the bracing element. By controlling the pressure within several channels running through the bracing element, pressure can be applied in a targeted manner. For example, the pressure can be applied flexibly over the entire welding region. By controlling the application of pressure, the control of the welding process can be improved. In particular, this is possible by controlling the pressure of the fluid medium.

Some main advantages of the methods, apparatuses and arrangements according to the disclosure herein or the advantageous refinements thereof will be discussed in more detail below.

Only simple and inexpensive equipment is necessary.

It is possible to use a continuous process.

For example, it would be possible for one or more infrared light sources to be arranged within a transparent tube and for the tube to be moved over the workpiece.

A movement of the at least one infrared light source, of the bracing element or else a joint movement of at least one infrared light source and of the bracing element, for example in accordance with the configuration above, allows a simple possibility of using a continuous welding process.

The tube could be rigid, for example composed of glass or the like. The tube could also be flexible (for example composed of silicone or polyimide) or the like.

Shapes other than a tube are also possible. The bracing element is preferably in the form of a rolling body. The bracing element could also have a chain of rigid segments that are flexibly articulated to one another (in the manner of tank treads).

A pressure exerted on the bracing element in the form of a tube or similar rolling body can, during the rolling or other movement, be transmitted as welding pressure to the workpiece parts that are to be connected.

The interior of the movable bracing element embodied, for example, as a rolling body or the like could serve as a fluid medium channel or have one or more fluid medium channels. The tube can then be temperature-controlled, for example.

In particular if flexible material is used for the tube or the other rolling body, the tube or the like could be internally charged with pressurized fluid. This makes it possible in particular for the contact pressure to be controlled.

In embodiments of the disclosure herein, one or more infrared light sources are advantageously arranged in the interior of a transparent flexible tube. By moving such a tube, contact pressure can be applied over relatively large surfaces during a continuous welding process. The tube is preferably composed, at least in certain regions, of a flexible material such as silicone, polyimide or some other film material, such as is also used for vacuum packaging films, which are also used in the production of fiber composite components. Use is preferably made of materials with a temperature resistance higher than the melting temperature of thermoplastic material of the first workpiece. On the other hand, the tube may be cooled by cooling fluid.

The pressure within the tube is preferably set to a value of 1 to 10 bar, preferably 4 to 8 bar. A welding force is applied to the tube and transferred to the workpiece parts that are to be connected.

It is also possible to use a semi-continuous process.

There is no need for elaborate protective measures, such as are necessary for example in the case of lasers.

There is no need for a special tool with high-speed movements and applications of pressure, as in the case of hitherto conventional infrared welding methods.

For industrial use in particular, this technology allows welded connections to be used even where only restricted access is available.

In addition, there are advantages that longitudinal connections, in particular in fuselages or other components of aircraft, can be provided without drilling and without cutting of frames or other structural elements.

Advantages of the method, of the apparatus and of the arrangement according to the disclosure herein and/or the advantageous refinements thereof in relation to hitherto known infrared welding methods will be discussed below.

In refinements of the disclosure herein, one of the workpiece parts to be connected becomes flexible during the welding process—in particular because of thermoplastic material. This allows the connection of workpiece parts with tolerances.

There is no need for quick changeovers between steps of the method.

There is no need for intermediate cooling of workpiece parts.

There is no need for high-speed movement of parts.

No complex movement tools or movement devices are necessary. Welding of complex parts is also possible with refinements of the disclosure herein.

Some advantages of the method, of the apparatus and of the arrangement according to the refinements according to the disclosure herein, and/or advantageous refinements, in relation to laser welding will be discussed below:

The infrared light source for generating the infrared light radiation used here is more cost-effective and far simpler than a laser such as is required for welding.

It is possible to use wavelengths in the range between 1000 and 2000 nm (in particular wavelengths in the IR-B or IR-C range) with a higher energy permeation rate or energy penetration rate in thermoplastic workpiece part that is to be connected.

No specific protective devices against radiation are necessary.

Simultaneous heating of the entire welding region is possible with simple equipment.

In relation to conduction welding known for example from [3], the method, the apparatus and the arrangement of the disclosure herein and/or the advantageous refinements thereof have in particular the following advantages:

The heating energy penetrates the workpiece parts internally not only by conduction but at least partially also by light energy transmission.

A significant reduction of the heating time is possible.

The welding is performed with increased efficiency.

The infrared transmission welding technology presented here could be used for different areas such as:

longitudinal and circumferential connections;
welding of clips, clamps, cleats and fastening elements to a vehicle skin;
welding of clips, clamps, cleats and fastening elements to a frame element;
welding of frame elements;
welding of a frame foot to a skin element;
welding of stringers or formers to a skin element;
welding of window frame structural components;
welding of door surround structural components;
welding of floor structures;
welding of holders, brackets and retaining elements;
welding of coupling elements such as frame couplings, stringer couplings, etc.

BRIEF DESCRIPTION OF THE DRAWINGS

Example embodiments of the disclosure herein will be discussed in more detail below on the basis of the appended drawings, in which:

FIG. 12 shows a further example embodiment for the workpiece, wherein a stiffening element is to be welded to a skin element of an aircraft;

FIG. 13 shows a highly schematic cross-sectional view through a fuselage component for an aircraft with different examples of welded connections that have been produced by the transmission welding method and the transmission welding arrangement according to the example embodiments of the disclosure herein; and FIG. 14 shows a schematic view of a vehicle using the example of an aircraft, wherein different possible applications of the transmission welding method and of the transmission welding arrangement according to example embodiments of the disclosure herein are illustrated.

DETAILED DESCRIPTION

Figure 1:
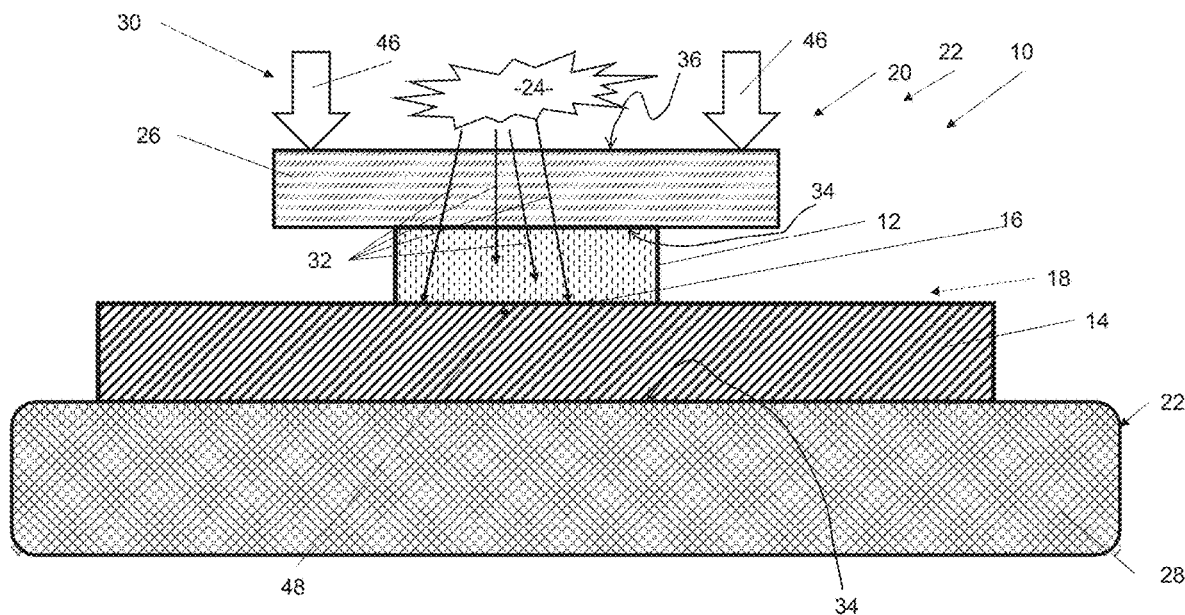
FIG. 1 is a schematic sectional illustration of a first embodiment of a transmission welding arrangement for carrying out a transmission welding method in which a first workpiece part and a second workpiece part are welded to form a workpiece.

FIGS. 1 through 8 illustrate different embodiments of a transmission welding arrangement 10 for carrying out a transmission welding method. The transmission welding arrangement 10 has a first workpiece part 12 and a second workpiece part 14, which are to be connected to one another by the transmission welding method at a weld point 16 to form a workpiece 18, and a transmission welding apparatus 20 for performing the welding of the workpiece parts 12, 14 by infrared transmission welding.

At least the first workpiece part 12 or both workpiece parts 12, 14 are formed from a thermoplastic material at least in certain regions, in particular at the weld point 16.

Thermoplastic material is preferably a thermoplastic fiber composite material. In one refinement, at least one of the workpiece parts 12, 14, preferably both workpiece parts 12, 14, has continuous fibers (not illustrated) in a thermoplastic matrix.

The first workpiece part 12 is selected from a group comprising a fiber-reinforced plastics component, a component with a matrix composed of thermoplastic material, a component with a matrix composed of PPS, a component with a matrix composed of PEKK, a component with a matrix composed of PEEK, a component with a matrix composed of PA, a component with a matrix composed of PEI, a component with a matrix composed of LM PAEK, a component with a matrix composed of FBI, a component with a matrix composed of PE, a component with reinforcement fibers in the form of a woven fabric, a component with reinforcement fibers in the form of a scrim, a component with reinforcement fibers in the form of unidirectional fibers, a component with reinforcement fibers in the form of short fibers, a component with reinforcement fibers in the form of continuous fibers, a component with reinforcement fibers composed of carbon, a component with reinforcement fibers composed of glass or glass materials, a component with reinforcement fibers composed of continuous carbon fibers, a component with reinforcement fibers composed of continuous glass fibers; a component with reinforcement fibers composed of short carbon or glass fibers, a component with reinforcement fibers composed of aramid fibers, a component with reinforcement fibers composed of silk, a component with reinforcement fibers composed of fibers from a biological source, a component with reinforcement fibers composed of ceramic, and a component composed of continuous fibers, and any combinations of these material specifications. Examples of fibers from a biological source would for example be silk or fibers from spiders.

The second workpiece part 14 is selected from a group comprising a fiber-reinforced plastics component, a component with a matrix composed of thermoplastic material, a component with a matrix composed of PPS, a component with a matrix composed of PEKK, a component with a matrix composed of PEEK, a component with a matrix composed of PA, a component with a matrix composed of PEI, a component with a matrix composed of LM PAEK, a component with a matrix composed of FBI, a component with a matrix composed of PE, a component with reinforcement fibers in the form of a woven fabric, a component with reinforcement fibers in the form of a scrim, a component with reinforcement fibers in the form of unidirectional fibers, a component with reinforcement fibers in the form of short fibers, a component with reinforcement fibers in the form of continuous fibers, a component with reinforcement fibers composed of carbon, a component with reinforcement fibers composed of glass or glass materials, a component with reinforcement fibers composed of continuous carbon fibers, a component with reinforcement fibers composed of continuous glass fibers; a component with reinforcement fibers composed of short carbon or glass fibers, a component with reinforcement fibers composed of aramid fibers, a component with reinforcement fibers composed of silk, a component with reinforcement fibers composed of fibers from a biological source, a component with reinforcement fibers composed of ceramic, and a component composed of continuous fibers, and any combinations of these material specifications.

The transmission welding apparatus 20 has a bracing device 22 for bracing the first workpiece part 12 and the second workpiece part 14 and has an infrared light source 24 for generating simple infrared light radiation, that is to say not laser radiation but polychromatic and incoherent infrared light radiation.

The bracing device 22 has a bracing element 26, a counterpart bracing element 28 and a bracing force generating device 30 indicated by arrows, by which the bracing element 26 is movable relative to the counterpart bracing element 28 and by which a bracing pressure can be generated between the bracing element 26 and the counterpart bracing element 28.

The bracing element 26 is formed, at least in a region with which it engages on the first workpiece part 12, from a material that is transparent to the infrared light radiation 32. The bracing element 26 has a bracing surface 34 by which the first workpiece part 12 is engaged on, and a rear side 36 situated opposite the bracing surface 34. Between the bracing surface 34 and the rear side 36, the bracing element 26 is, at least in certain regions, transparent to the infrared light radiation 32.

The infrared light source 24 is arranged on the rear side 36 and is designed to direct the infrared light radiation 32 through the bracing element 26 onto the first workpiece part 12.

In some refinements, in particular as shown in FIGS. 1 through 5, the bracing element 26 is composed of a rigid material such as glass, in particular temperature-resistant glass, and may be in the form of a bracing jaw or pressure plate.

Figure 6:
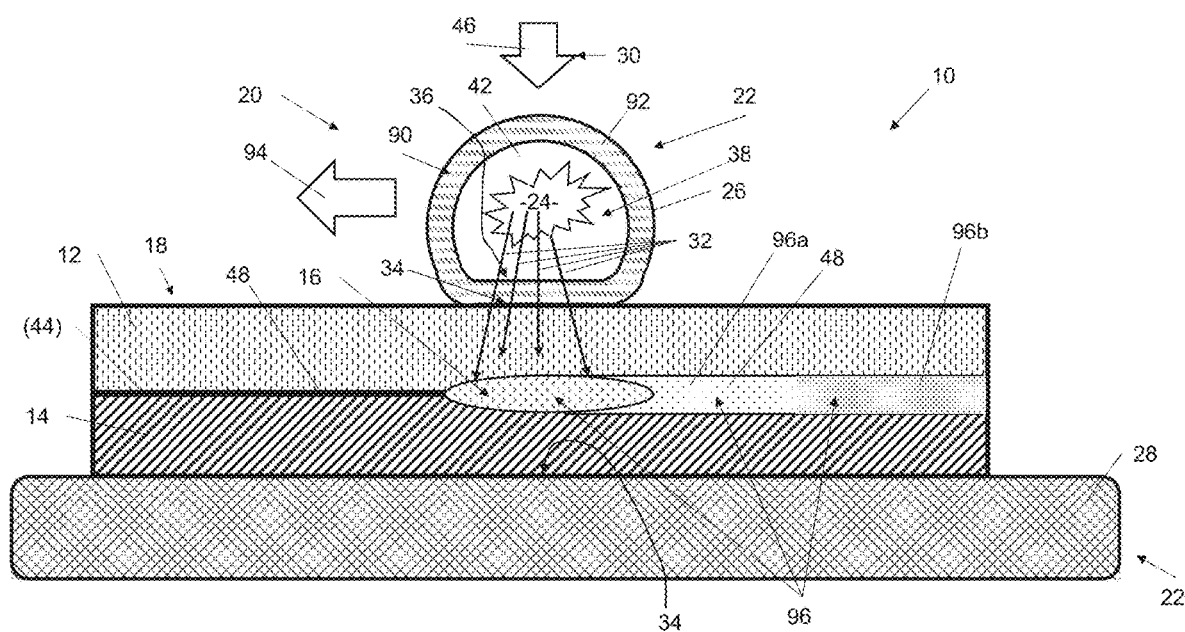
FIG. 6 is a schematic sectional illustration similar to FIG. 3 of a fifth embodiment of the transmission welding arrangement.

In other configurations, as shown in FIG. 6, the bracing element 26 is, at least in one region, in particular in a region that at least partially forms the bracing surface 34, composed of a flexible material such as silicone-containing material, and thus has, for example, a flexible skin region for bearing against the workpiece 18, in particular against the first workpiece part 12.

Figure 4:
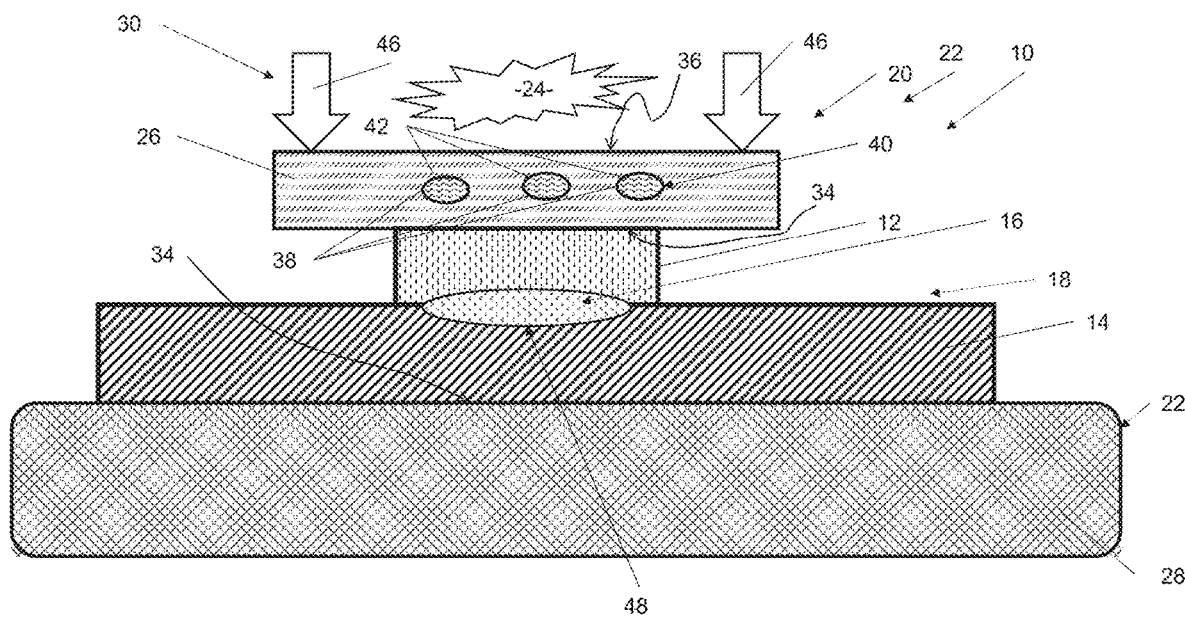
FIG. 4 is a schematic sectional illustration similar to FIG. 3 of a third embodiment of the transmission welding arrangement.

In an embodiment as illustrated in FIG. 4, the bracing element has at least one fluid cavity 38 for a fluid medium 40. In particular, several channels 42 are formed through which fluid medium 40 flows, which fluid medium can be temperature-controlled by a temperature-control device having a heating device and/or a cooling device and can be placed under controlled fluid pressure by a pump or similar pressure generating device. In this embodiment according to FIG. 4, the bracing element 26 may be at least partially composed of flexible material instead of a rigid material.

In the embodiments illustrated in FIGS. 1 through 4, the bracing element 26 is in the form of a pressure plate or bracing jaw. In the embodiments illustrated in FIGS. 5 and 6, the bracing element 26 is in the form of a rolling body 90, for example in the form of a sphere, roller, roll or tube 92, which is rotatable about an axis of rotation. In these refinements, the bracing surface 34 is formed on the outer circumference of the rolling body 90, while the inside of the rolling body 90 forms the rear side 36. In these embodiments, the at least one infrared light source 24 is arranged in the interior of the rolling body 90. In the refinements according to FIGS. 7 and 8, the bracing element 26 has rigid components and flexible components.

In some refinements, the counterpart bracing element 28 is in the form of a fixed base or support, for example a bracing table or a smaller fixed support. The bracing force generating device 30 is designed to move the bracing element 26 with a defined force against the counterpart bracing element 28.

In a larger refinement, the counterpart bracing element 28 may be fixedly fastened to a machine table, whilst the bracing element 26 can be moved against the counterpart bracing element 28 by a hydraulic or pneumatic cylinder or some other actuator, for example an electric motor with a threaded rod. In another particularly simple and compact transmission welding apparatus 20, the bracing element 26 and the counterpart bracing element 28 may be in the form of jaws of a type of case.

In refinements of the transmission welding apparatus 20 that are particularly well suited for carrying out a continuous transmission welding method, the transmission welding apparatus 20 has a movement device 94 for moving the bracing element 26 relative to the counterpart bracing element 28 and thus for moving the bracing element 26 over the workpiece 18. Examples of these refinements are illustrated in FIGS. 5 to 8.

FIG. 1 shows a first embodiment of the transmission welding arrangement 10, wherein the first workpiece part 12 and the second workpiece part 14 lie directly one on top of the other and the infrared light radiation 32 is in a spectrum with wavelengths in a range to which the first workpiece part 12 is at least up to 2%, more preferably 10 to 20%, most preferably up to 30%, transparent. The remaining infrared light radiation 32 is absorbed in the first workpiece part 12 and converted into heat, which softens thermoplastic material of the first workpiece part 12. The welding energy passes to the weld point 16 partly by conduction. A proportion of the infrared light radiation 32 also passes to the weld point 16 by transmission, the weld point being formed here at those sides or surfaces of the workpiece parts 12, 14 which are braced together.

Figure 3:
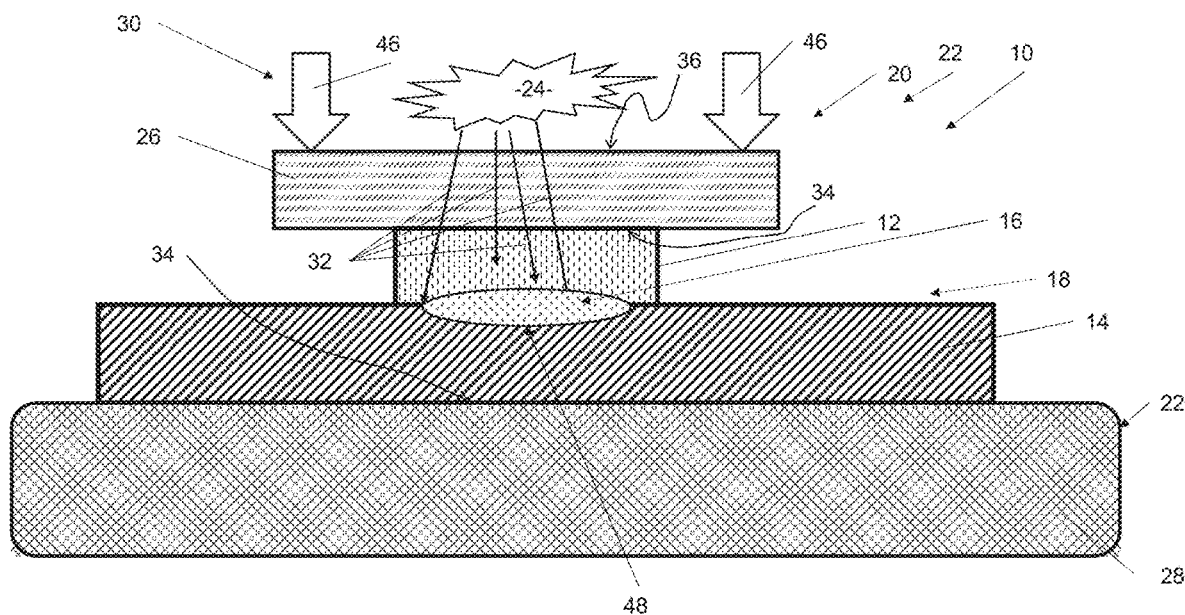
FIG. 3 is a schematic sectional illustration similar to FIG. 1 of the transmission welding arrangement during the course of the transmission welding method, wherein thermoplastic material has been fused or plasticized at a weld point at which the first workpiece part is to be connected to the second workpiece part.

As illustrated in FIG. 3, this leads to a fusion of thermoplastic material at the weld point 16, such that welding can be carried out.

Figure 2:
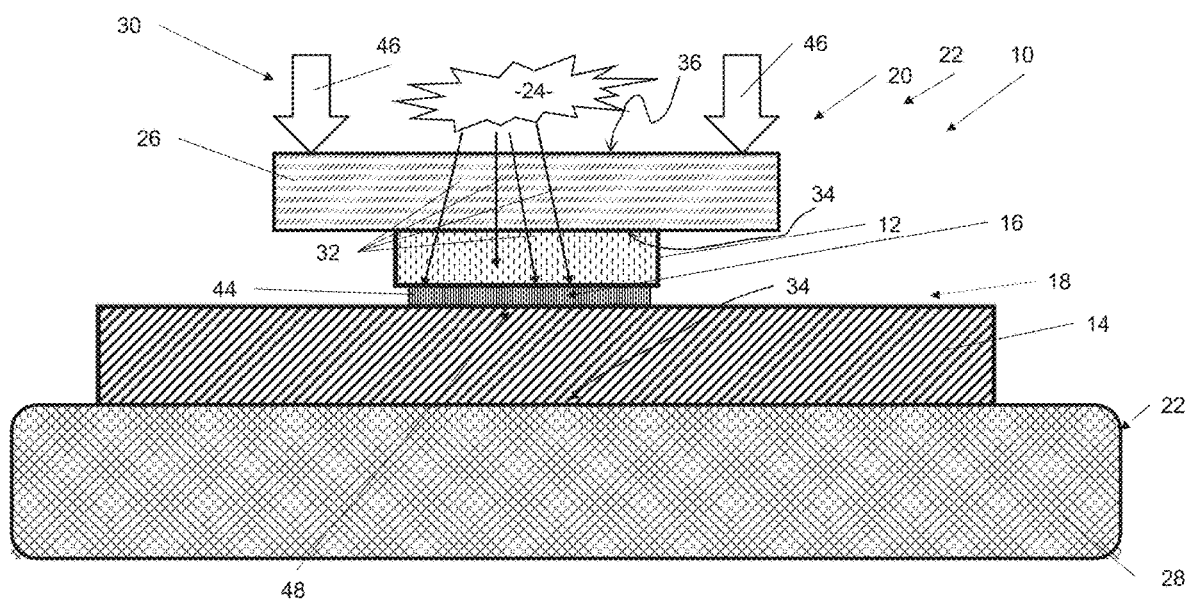
FIG. 2 is a schematic sectional illustration similar to FIG. 1 of a second embodiment of the transmission welding arrangement.

FIG. 2 shows a refinement of the transmission welding arrangement, where an additional layer 44 is also provided between the workpiece parts 12, 14. The additional layer 44 may be formed from thermoplastic material and thus provide additional fusion material for the welding process. Other additional layers 44 are also conceivable; for example, the additional layer 44 may have a material to be laminated or a functional layer.

In both embodiments according to FIGS. 1 and 2, the situation illustrated in FIG. 3 arises during welding, where either thermoplastic material of the workpiece parts 12, 14 or thermoplastic material of the workpiece parts 12, 14 and the additional layer 44 are fused at the weld point 16 by the infrared light radiation 32, which is directed partially by transmission and partially by conduction to the weld point 16.

FIG. 4 shows the refinement with the fluid cavities 38 in the form of channels 42.

Here, before the welding process is carried out, heated fluid medium 40 can be conducted through in order to preheat the transmission welding arrangement and in particular the workpiece parts 12, 14.

If the bracing element 26, as stated above, is at least partially formed from flexible material, the contact pressure of the bracing element 26 against different regions of the bracing surface 34 can be controlled through control of the pressure of the fluid medium 40.

After the welding process, the cooling and thus the consolidation of the material fused at the weld point 16 can be controlled through targeted temperature control of the fluid medium 40. For example, postheating may be performed here, or targeted cooling may be used.

In another approach, cooled fluid medium 40 serves to cool that side of the first workpiece part 12 which is situated opposite the weld point 16, such that the fusion of thermoplastic material occurs closer to the weld point 16.

Refinements of the embodiment shown in FIG. 4 thus have a fluid medium system (not illustrated) with a pressure generator, for example a pump or a pressurized medium reservoir, preferably automatically controllable valves, and a preferably automatically controllable temperature-control device—for example heating and/or cooling device. The fluid medium system may have a hydraulic circuit for oil or water or a compressed-gas system, for example a compressed-air source for supplying compressed air, cooling air and/or heating air.

Some refinements of the transmission welding apparatus 20 have a controller for controlling the infrared light source 24, the bracing force generating device 30 and, if applicable, the fluid medium system and/or the movement device 92.

Figure 5:
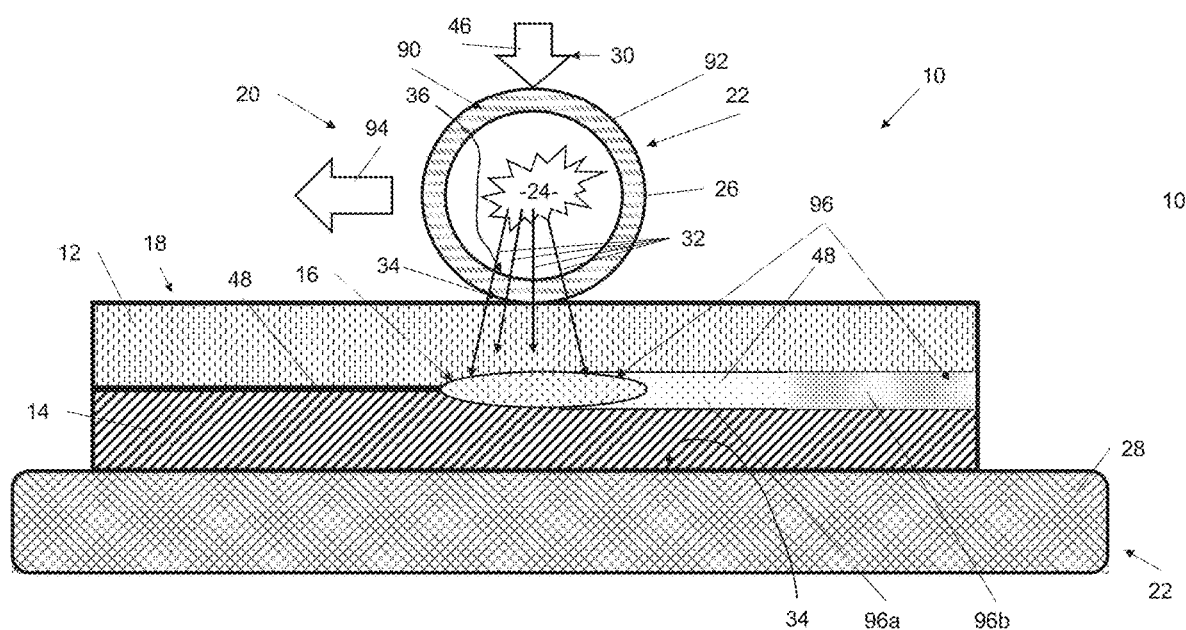
FIG. 5 is a schematic sectional illustration similar to FIG. 3 of a fourth embodiment of the transmission welding arrangement.

In the fourth embodiment illustrated in FIG. 5, the bracing element 26 is in the form of a rolling body 90 in the form of a tube 92 composed of a rigid material, in particular glass, which is transparent to the infrared light radiation 32, and one or preferably more infrared light sources 24 are in the interior of the tube 92 over the length thereof. The tube 92 is rotatably mounted in a manner that is not illustrated, and is movable over the first workpiece 12 by the movement device 94.

The fifth embodiment shown in FIG. 6 substantially corresponds to the fourth embodiment with the difference that the tube 92 is formed at least in the region of the bracing surface 34 from a flexible material such as silicone or polyimide (for example Kapton® film) or vacuum packaging film. The interior of the tube 92 serves as a fluid cavity 38 into which fluid medium—in particular in the form of temperature-controlled air with a controlled pressure—can be introduced through a fluid medium system (not illustrated in any more detail) of the type discussed above.

Figure 7:
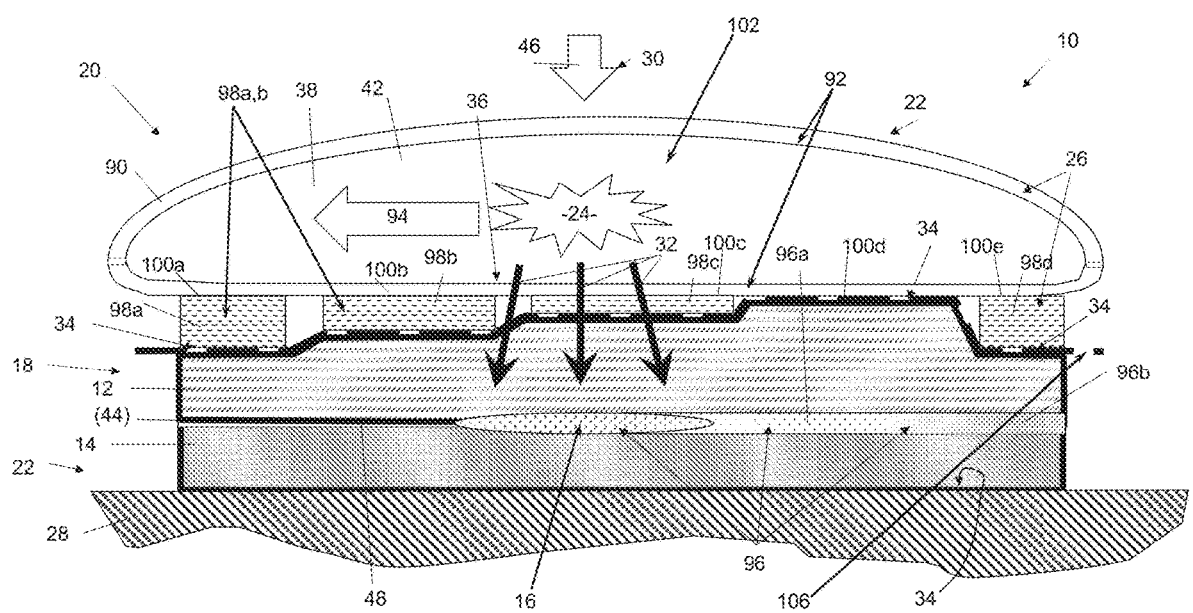
FIG. 7 is a schematic sectional illustration similar to FIG. 3 of a sixth embodiment of the transmission welding arrangement.

In the embodiments of FIGS. 5 through 7, the bracing element 26 can be moved together with the at least one infrared light source 24 over the workpiece 18 in order to thus continuously weld a relatively large welding region 96. According to FIGS. 5 through 8, the welding region 96 has the weld point 16, with the material that has just been fused, and zones 96a and 96b, which are situated behind the weld point 16 in the direction of movement and which are already cooling.

Figure 8:
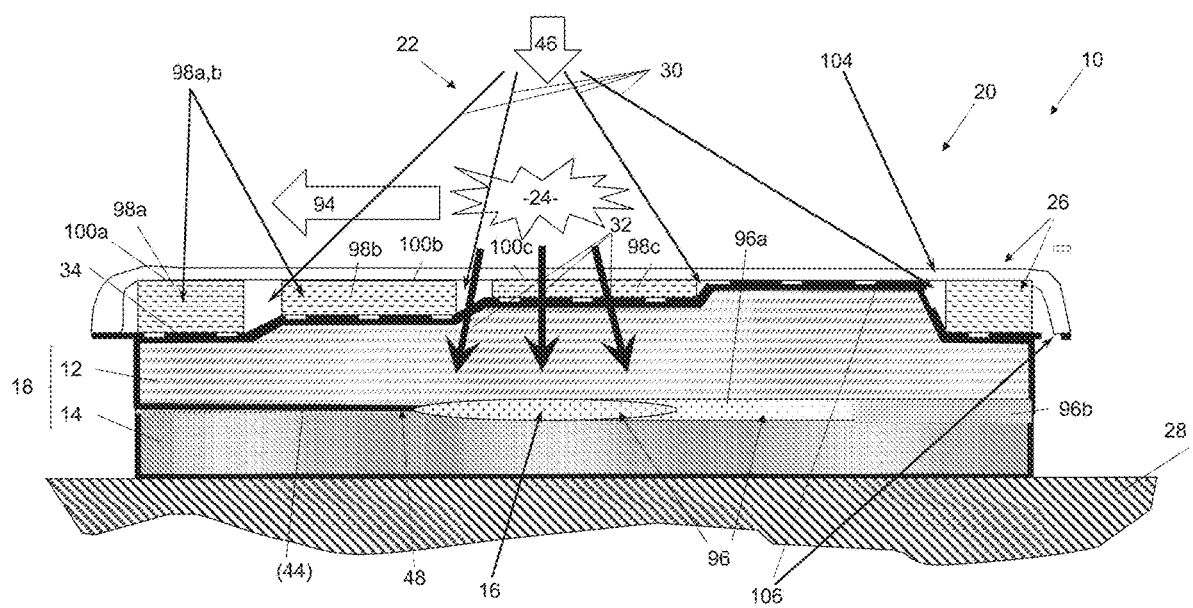
FIG. 8 is a schematic sectional illustration similar to FIG. 3 of a seventh embodiment of the transmission welding arrangement.

In the refinements according to FIGS. 7 and 8, the bracing element 26 has rigid segments 98a, 98b, 98c, 98d of different thicknesses. The thickness of the segments 98a-98d is adapted to the topology of the first workpiece part 12. Unevennesses and varying heights on the surface of the first workpiece part 12 can thus be compensated for by the rigid segments 98a-98d, such that pressure surface regions 100a-100e are provided which are arranged approximately at the same height.

In the embodiment according to FIG. 7, the bracing element 26 also has the flexible tube 92, which lies, and exerts pressure, on these pressure surface regions 100a to 100e under the influence of internal pressure 102 in the tube 92—set for example by the fluid medium 40.

In the refinement according to FIG. 8, the bracing element 26 has a vacuum packaging film 104. The region between the vacuum packaging film 104 and the first workpiece part 12 can be evacuated by a pump (not illustrated) or the like, such that the pressing pressure 46 is exerted by the vacuum. At the same time, the flexible vacuum packaging film 104 connects the different rigid segments 98a-98d.

Furthermore, in the refinements of FIGS. 7 and 8, a separating film 106 is provided between the bracing element 26, in particular the rigid segments 98a-98d, and the surface of the first workpiece part 12, which separating film prevents an adhesion of the bracing element 26 or of the parts thereof, in particular of the segments 98a-98d, to the first workpiece part 12.

In the embodiments of FIGS. 7 and 8, the bracing element 26 thus has a combination of rigid and flexible elements. This is advantageous in particular for carrying out a welding process along a welding region 96, 96a, 96b with a varying topology of the workpiece 18. A separating film 106 (composed for example of Kapton® or silicone, . . . ) prevents adhesion.

Rigid segments 98a-98d with an adapted thickness are provided for transmitting the mechanical pressure 46 to the uneven surface of the workpiece 18.

In the refinement according to FIG. 7, the mechanical pressure 46 for applying a welding force is applied by the flexible tube 92 to the pressure surfaces 100a-100e and thus via the segments 98a-98d, or else in certain regions directly, to the workpiece 18.

FIG. 8 shows another possibility for the generation of the bracing force and of the mechanical pressure. Here, the mechanical pressure 46 is generated by vacuum. The bracing force generating device 30 thus has a pump (not illustrated) or the like. Instead of the flexible tube 92, the bracing element 26 has the vacuum packaging film 106, with which the bracing force generated by the vacuum is applied.

In all configurations of the transmission welding arrangement 10, simple, that is to say polychromatic and incoherent infrared light radiation is directed through the bracing element 26 and at least partially through the first workpiece part 12 to the weld point 16.

A refinement of the transmission welding method, as can be carried out with the embodiments of FIGS. 1 through 4, will be discussed in more detail below on the basis of the individual process steps.

Both parts to be connected—first workpiece part 12 and second workpiece part 14—are positioned relative to one another in the bracing device 22, which is designed for example as a clamping apparatus.

The upper part of the bracing device 22 illustrated at the top in each of the figures—the bracing element 26—should be designed to be transparent to the infrared light radiation and possibly flexible.

As illustrated in FIG. 2, it would be possible for at least one additional layer—additional layer 44—for example matrix layer—to be placed between the workpiece parts 12, 14 to be connected. An additional layer could also be integrated into one of the two workpiece parts 12, 14 before the welding process.

A mechanical pressure 46 is subsequently exerted by the bracing device 22 via the bracing element 26 and the counterpart bracing element 28. The bracing element 26 serves, for example, as a transparent part for the application of pressure. The counterpart bracing element 28 is, for example, a solid base or part of a clamping mechanism.

The infrared light source 24 is subsequently positioned over the transparent bracing element 26.

Infrared heating is applied as a transmission heating source through the transparent bracing element 26 to the outer surface of the first workpiece part 12.

The infrared light radiation heats the first workpiece part 12, partially in the form of surface heating and partially as penetrating heating energy because of transmission in the first workpiece part 12 to the connection region 48—that is to say the weld point 16—between the workpiece parts 12, 14.

The connection region 48 and thus the weld point 16 is heated over a large area.

The energy of the infrared light radiation 32—infrared heating—leads to the heating of the connection region 48—weld point 16—and to the fusion of the material of the workpiece parts 12, 14 or, if applicable, of the additional layer 44. The transmission welding arrangement 10 with correspondingly fused material at the weld point 16 at the connection region 48 is illustrated in FIG. 3.

FIG. 4 shows an optional possibility of infrared through welding with heating assistance from fluid medium 40.

One of the elements 26, 28 of the bracing device 22 by which the workpiece parts 12, 14 are clamped together—or both bracing elements 26, 28—could have one or more channels 42 as fluid cavities 38.

During the welding process, a fluid medium 40 could be provided in these channels 42 in order to improve the temperature and pressure distribution during the welding.

If—as illustrated in the refinement in FIG. 4—the bracing element 26, through which the infrared light radiation 32 of the infrared light source 24 is directed, is provided with channels 42 for the fluid medium 40, then it is advantageous if the fluid medium 40 is likewise at least partially or is at least largely transparent to the infrared light radiation 32.

In one embodiment, this is achieved by using high-temperature-resistant oil or water as the fluid medium 44.

The temperature of this fluid medium 44 is then controlled. This makes it possible to reduce the heating time by preheating the fluid medium 44, to reduce the welding time by additionally heating fluid medium 44 and/or to provide a better crystallization rate through postheating or through control of the cooling rate.

In one refinement of the embodiment of the transmission welding arrangement 10 illustrated in FIG. 4, the bracing element 26, 28 provided with the channels 42, in this case in particular the transparent bracing element 26, is formed from a flexible material at least in the region of the bracing surface 34. A suitable material that is also transparent to infrared light radiation 32 would be silicone or polyimide. In the case of the counterpart bracing element 28, it is also possible for other flexible materials to be provided for delimiting the channel 42 and for forming the counterpart bracing surface 34 if the channels 42 or a proportion of the channels 42 are provided in the counterpart bracing element 28.

In this refinement, the pressure of the fluid medium 40 within the channels 42 is controlled—in particular individually for each channel 42. This allows the possibility of controlling the pressure over the bracing surface 34 and thus over the entire welding region—connection region 48/weld point 16.

In addition, the pressure can be controlled over the chronological course of the welding process in order to thus improve the control of the welding process through control of the welding pressure by the fluid medium 40.

Preferred refinements of a continuous transmission welding method, as can be carried out with the embodiments of the transmission welding apparatus 20 of FIGS. 5 to 8, will be discussed in more detail below on the basis of the individual process steps.

Firstly, the first workpiece part 12 and the second workpiece part 14 are positioned relative to one another in the bracing device 22, for example are placed in a manner adapted to one another onto the counterpart bracing element 28 in the form of a support. As discussed above with regard to FIG. 3, it is also possible here for the additional layer 44 to optionally be introduced, even though it is not illustrated in FIGS. 5 to 8.

Subsequently, in the refinements of FIGS. 5 and 6, the tube 92 with the bracing force generating device 30 is pressed onto the first workpiece 12 in order to generate the mechanical pressure 46. The infrared light sources 24 are activated in order to direct the infrared light radiation 32 through the tube 92 onto the first workpiece part 12. The effects are the same as described above with regard to the embodiments of the transmission welding method on the basis of FIGS. 1 through 4. The material at the weld point 16 is correspondingly fused.

By the movement device 94, the bracing element 26, which is in the form of a rolling body 90, is then moved over the surface of the first workpiece part 12. The rolling body 90 rolls on the surface and, by way of the bracing surface 34, continues to exert the mechanical pressure 46 on the workpiece 18 as welding pressure. The infrared light sources 24 arranged in the interior of the tube 92 are correspondingly moved conjointly. The welding region 96 is thus welded in continuous fashion.

In the embodiment illustrated in FIG. 6, because of the flexible material, the active region of the bracing surface 34 can be adjusted through adjustment of the bracing force and of the pressure in the interior of the tube 92. As shown by a comparison of FIGS. 5 and 6, a larger surface region of the workpiece 18 can thus be subjected to the mechanical pressure. A similar effect could also be achieved by a bracing element 26 supported in the manner of tank tracks.

In a method that can be carried out with the refinements according to FIGS. 7 and 8, the separating film 106 is firstly placed on. Differences in height are compensated for by rigid segments 98a-98d of corresponding thickness.

It is also the case in FIG. 7—as described above for FIG. 6—that the flexible tube 92 is subsequently moved together with the infrared light source 24 over the workpiece 18. The contact pressure is controlled by way of the internal pressure 102 in the flexible tube 92.

In the approach according to FIG. 8, the vacuum packaging film 104 is placed onto the rigid segments 98a-98d and the workpiece. The space between the vacuum packaging film 104 and the workpiece 18 is evacuated in order to thus exert the mechanical pressure 46. The infrared light source 24 is subsequently moved by the movement device 94 over the workpiece 18 in order to thus carry out the continuous welding.

Various experiments for carrying out the transmission welding method have been performed successfully.

For this purpose, transmission tests were firstly performed on various thermoplastic fiber composite materials. Specifically, a fiber composite material with unidirectional glass fibers with sample thicknesses of 0.7 mm, 1.2 mm, 2.6 mm and 2.9 mm was tested with infrared light radiation of different wavelengths. In the case of all of these samples, there was a significant increase in transmission above 1000 nm with a peak at approximately 1600 nm and, furthermore, also good transmissivity values at wavelengths in the range from 1650 nm to 2000 nm. Further different thermoplastic materials such as PEEK and PPS, also with carbon fiber or glass fiber reinforcement, were also tested. It was found with all of these that the transmission in the case of a standard laser wavelength of 940 nm for a standard diode laser is low. For such laser radiation, the major part of the radiation is very quickly absorbed in the first workpiece part 12. In the case of such laser radiation, it is only by conduction heat that the second workpiece part 14 is also fused. This often has the effect that the first workpiece part 12 is completely fused and a defined connection thus becomes difficult.

It is therefore desirable to perform welding with wavelengths in the range around 1600 nm, where thermoplastic materials have greater transparency.

The maximum transmittance of presently used thermoplastic materials lies in the range from 1000 nm to 1600 nm. However, there are no welding lasers on the market that would output radiation in this range, and very expensive special laser apparatuses would be necessary. According to DIN 5031, infrared radiation is categorized into IR-A with a wavelength of 0.78 to 1.4 μm, IR-B with a wavelength of 1.4 to 3.0 μm and IR-C with a wavelength of 3 to 50 μm and 50 to 1000 μm. IR-A and IR-B represent the near infrared range. IR-A is the short-wave range of the near infrared range (abbreviation: NIR). The 780 nm limit is because of the human sense of sight adapted to the solar spectrum. IR-B radiation represents the long-wave range of the NIR range. The boundary between IR-A and IR-B is based on the water absorption at 1450 nm.

Infrared radiation IR-C can be categorized into mid-infrared MIR from 3 to 50 μm and far-infrared FIR from 50 to 1000 μm. Mid-infrared is the range of thermal radiation at terrestrial temperatures. The atmosphere strongly absorbs far-infrared.

Based on the above considerations with regard to the transmittance of certain wavelengths in thermoplastic materials, an infrared light source 24 that emits IR-B and/or IR-C radiation is particularly preferably selected.

The short-wave infrared range (SWIR) IR-B extends from 1.4 to 3 μm. This range is relatively safe for the eyes because such light is absorbed in the eye before it can reach the retina.

An infrared lamp with a power of 400 W from an infrared heater of the Adler type (serial number 1803 with a total power of 2×400 W, at an operating voltage of 220 to 240 V and an operating current frequency of 50/60 Hz) was used for experiments.

Such an infrared lamp has a ceramic infrared source. The infrared source is in the form of a compact rod. The exact spectrum was not inspected; it is likely to be in the IR-B range, in particular between 1000 and 1600 nm.

Only one lamp of the two lamps in this radiant heater was used.

This lamp also has an upper reflector, such that the infrared light radiation emerges in a directed manner to one side.

The lamp emits radiation with a constant energy level.

As the bracing force generating device 30, use was made of bracing clamps that generate a clamping force by mechanical springs. The exact clamping force was not measured.

A glass plate with a thickness of approximately 1.5 mm was initially used as the transparent bracing element 26.

In a first example experiment, a piece of fiber composite material with unidirectional glass fibers in a PEKK matrix and a thickness of 1.2 mm was used as the first workpiece part 12.

A strip of fiber composite material with unidirectional carbon fibers in a PEKK matrix and a thickness of 1.8 mm was used as the second workpiece part 14.

Welding was subsequently performed, as illustrated in FIG. 1, with the following welding parameters:

Welding energy: 400 W

The entire length of the rod-shaped heating lamp was heated.

The spectrum was not measured, it is assumed to be infrared B with a wavelength of 1000 nm to 1600 nm.

Only a spring force was applied as mechanical pressure 46, and only locally. The exact clamping force was not measured.

The welding was performed for 120 s.

The welding result was then inspected. It was found that the first workpiece part 12 and the second workpiece part 14 were firmly connected to one another. Local fusion of the first workpiece part 12 was identified.

A visual comparison with a corresponding sample welded by laser welding showed the same welding performance for the infrared transmission welding as for the laser transmission welding.

However, the infrared transmission welding was performed with significantly less expensive equipment—a simple infrared lamp—that does not require any specific protective measures, as is the case for example with a laser.

As a second test, a continuous welding process according to the embodiment of FIG. 5 was performed. The same workpiece parts 12, 14 were used as in the first test; as the bracing element 26, a cylindrical tube 92 composed of glass was used, through which the abovementioned rod-shaped infrared lamp as the infrared light source 24 was inserted through the tube 92. The welding was then performed with the following welding parameters:

An infrared lamp arranged in the tube 92 was used as the infrared light source 24. The infrared lamp had a power of 400 W and was heated over its entire length. As mentioned above, the exact spectrum is not known, but is assumed to be infrared B radiation (in the range from 1000 to 1600 nm). The tube 92 was composed of heat-resistant glass (lantern glass). The mechanical pressure was applied locally. The above-described clamping apparatus with mechanical clamps was used. The exact clamping pressure was not measured. The welding time was 120 s. This test also showed good welding quality.

As a further test, welding through a silicone layer was tested in order to test the performance of this material for use for the bracing element 26. The test was carried out under the same conditions as for the first test, wherein a strip of silicone was used in place of the glass plate. Here, too, the materials were welded together, but the results were poorer than with the glass plate. Accordingly, silicone materials should be selected in accordance with their transmittance for the infrared light radiation 32 used. It is also expedient to use silicone materials that are resistant to temperatures of higher than 400° C.

As a further test, the test was carried out with a Kapton® film instead of the glass plate of the first experiment. This yielded very good results that show that Kapton® or similar polyimides are highly suitable for forming a flexible bracing element. Other vacuum packaging films with correspondingly high temperature resistance may also be used.

Polyimide is suitable both as a material for the bracing element 26 or also as a non-stick coating for the bracing element 26, which is composed for example of glass. Polyimide showed efficient properties as a peel-off film (release film 106) and prevents adhesion of fused thermoplastic material to the surface of the bracing element 26.

In a further test, workpiece parts 12, 14 composed of the high-performance thermoplastic PEKK, reinforced with continuous carbon fibers, were welded to one another under the same conditions as described above for the first test. Here, too, the welding performance was the same as for laser transmission welding.

In tests, it was found that the infrared transmission welding illustrated here using simple polychromatic, incoherent infrared light can be used for different materials. Welding of test materials with continuous carbon fibers, continuous glass fibers and short glass fibers as fiber reinforcement was performed successfully. Welding is also suitable for materials with short carbon fibers and various other fibers, such as aramid, silk or other biologically producible fibers, both in the form of long or continuous fibers or of short fibers, as fiber reinforcement. Welding of test materials with a PEKK matrix and with a PPS matrix was performed successfully. The method is also suitable for LM PAEK, PEEK, PEI, PBI, PA, PE, etc. as a matrix.

Different possible applications for the above-discussed refinements of the infrared transmission welding method and of the above-discussed transmission to form welding apparatuses 20 will be discussed in more detail below with reference to FIGS. 7 through 12.

FIG. 1 shows a first possible application scenario in which the first workpiece part 12 and the second workpiece part 14 are continuously welded to one another at a butt joint.

Figure 9:
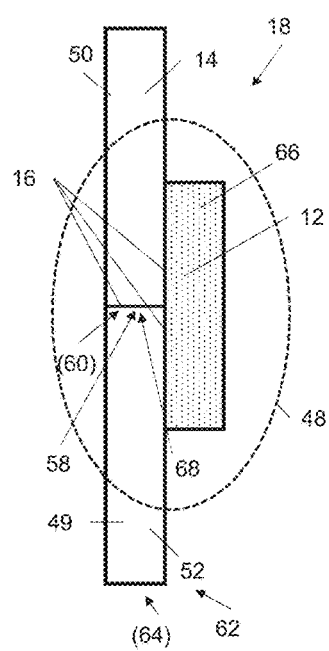
FIG. 9 shows a schematic sectional view through a first example embodiment of the workpiece, the workpiece parts of which are skin elements of an aircraft that are being welded to one another at a longitudinal seam.

FIG. 9 shows an example embodiment for the workpiece 18, wherein the first workpiece part 12 and the second workpiece part 14 are for example a first skin element 50 and a second skin element 52 of a vehicle illustrated in FIGS. 13 and 14 in the form of an aircraft configured as an airplane 54. The welding indicated in FIG. 9 can be used both for longitudinal connections 58 and for circumferential connections 60 of skin elements 50, 52 or of other fuselage components 62 or of wing components 64 of the aircraft 54.

In FIG. 9, the connection region 48 is illustrated in dashed lines by an oval. Two workpiece parts 14, 49 in the form of skin elements 50, 52 are to be connected to one another at a butt joint. In the application example of FIG. 9, a reinforcement strip 66 composed of thermoplastic fiber composite material is provided as the first workpiece part 12, which covers the butt joint between the second workpiece part 14 formed as the first skin element 50 and a third workpiece part 49 formed as the second skin element 52. The skin elements 50, 52 are formed for example from thermoplastic carbon fiber reinforced composite material (CFRP/TP). The reinforcement strip 66 used as a doubler is formed for example from unidirectional glass fibers in a thermoplastic matrix or as a carbon fiber-reinforced strip with a likewise thermoplastic matrix.

The welding may for example be performed through the reinforcement strip 66 from the right as seen in FIG. 9. That is to say, a transparent bracing element 26 is placed onto the reinforcement strip 66, and the infrared light radiation 32 is directed through the bracing element 26 and the reinforcement strip 66 into the butt joint 68 between the skin elements 50, 52 in order to weld the skin elements 50, 52 here. At the same time, the skin elements 50, 52 are welded to the reinforcement strip 66.

Figure 10:
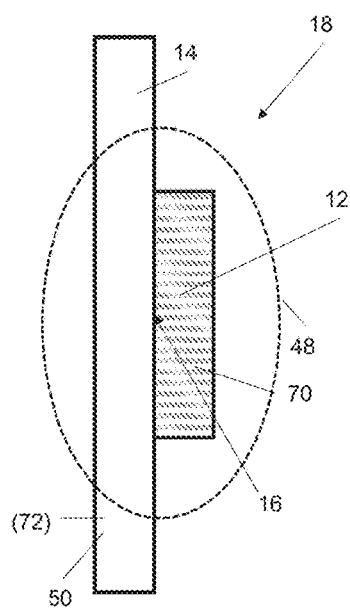
FIG. 10 shows a further example embodiment for the workpiece, wherein a fastening element is being welded to a skin element of an aircraft.

FIG. 10 shows a further possible application example, wherein a fastening element 70 is used as the first workpiece part 12 and a skin element 50 or a frame element 72 of the aircraft 56 is used as the second workpiece part 14.

The fastening element 70 may for example be a clip element, a fastening plate, a cleat, a hook, a fastening eyelet or the like. The fastening element 70 is for example in the form of a thermoplastic glass fiber composite material. The glass fibers may be present as short fibers, as unidirectional fibers or as continuous fibers. Alternatively, the fastening element may be in the form of a thermoplastic carbon fiber composite material part. Here, too, the carbon fibers may be unidirectional, in the form of short fibers or in the form of continuous fibers.

As before, possible materials for the frame element 72 or the skin element 50 are carbon fiber composite materials with a thermoplastic matrix. The same principle as in FIG. 10 can also be used for the welded connection of brackets or attachments.

Figure 11:
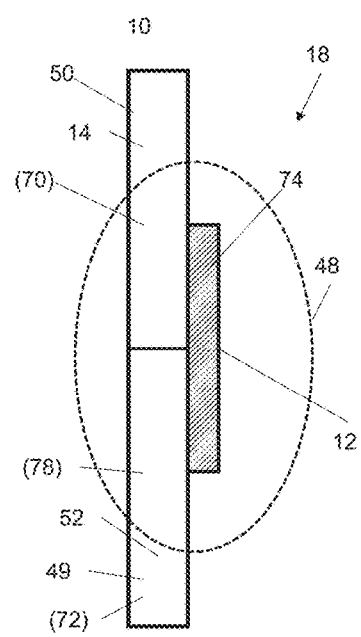
FIG. 11 shows a further example embodiment for the workpiece, wherein a coupling element is to be welded on for the purposes of connecting two structural components of an aircraft.

FIG. 11 shows a further application scenario in which a coupling part 74 as the first workpiece part 12 is being welded to a skin element 50 or a frame element 72 as the second workpiece part 14. The coupling part 74 may then serve for the coupling-on of a further frame element 76 or of a second skin element 52.

Possible materials for the coupling part 74 are thermoplastic materials with glass or carbon fibers. The fibers may be provided unidirectionally, as continuous fibers or in the form of woven fabrics or scrims.

The frame element 72 may for example be designed as a stiffening element, for example in the form of a stringer 80 or of a former (not illustrated). Preferred materials for this are again carbon fiber composite materials with a thermoplastic matrix. The same principle as in FIG. 11 can also be applied for the coupling-on of other components, such as floor struts, seat rails, bearings, door frame and window frame parts or the like.

FIG. 12 shows a further application scenario, wherein a stiffening element 78, for example a stringer 80—as an example for a frame element 72—as the first workpiece part 12 is being welded to a skin element 50 as the second workpiece part 14.

FIG. 13 shows a highly schematic cross section through a fuselage component 62 of the aircraft 54 with the stringer 80, with a floor element 86 and with a retaining bracket 88 as examples of workpiece parts 12 that are to be connected to a frame element 52 or a skin element 50 of the fuselage component 62 by the transmission welding method.

FIG. 14 shows the side view of the airplane 54 as an example of the aircraft 56 with different possible areas of application for connections to be produced using the transmission welding method. For example, parts 82 that form a structure around a door 84 can also be welded.

Above, arrangements, apparatuses and methods for infrared transmission welding have been proposed and described on the basis of example embodiments.

A new technology is thus proposed which combines the advantages of laser transmission welding, conduction welding and conventional infrared welding and which can be carried out using simple equipment.

The proposed technology can be applied to different connections. Examples of these are the integration of stiffening elements 78, such as stringers 80, connections and couplings, integration of frames and fastening elements 70, integration of brackets and holders 88.

The technology has been successfully tested using very simple equipment. The welding capability was thus demonstrated. It has been shown that the infrared energy can transmit through thermoplastic first workpiece part to the connection region 48.

It has been shown that even high-performance thermoplastic materials, such as PEKK, with fiber reinforcement and fusion temperatures around approximately 330° C. can be welded.

It has been shown that transmission welding through a transparent bracing element 26, such as a glass plate, is possible.

It has also been shown that clamping force can be applied by the bracing element 26 at the same time.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

10 Transmission welding arrangement
12 First workpiece part
14 Second workpiece part
16 Weld point
18 Workpiece
20 Transmission welding apparatus
22 Bracing device
24 Infrared light source
26 Bracing element
28 Counterpart bracing element
30 Bracing force generating device
32 Infrared light radiation
34 Bracing surface
36 Rear side
38 Fluid cavity
40 Fluid medium
42 Channel
44 Additional layer
46 Mechanical pressure
48 Connecting region
49 Third workpiece part
50 First skin element
52 Second skin element
54 Airplane
56 Aircraft
58 Longitudinal connection
60 Circumferential connection
62 Fuselage component
64 Wing component
66 Reinforcement strip
68 Butt joint
70 Fastening element
72 Frame element
74 Coupling part
76 Further frame element
78 Stiffening element
80 Stringer
82 Part of a surrounding structure for door
84 Door
86 Floor element
88 Retaining bracket
90 Rolling body
92 Tube
94 Movement device
96 Welding region
96a Relatively warm zone of the welding region
96b Relatively cold zone of the welding region
98a First rigid segment
98b Second rigid segment
98c Third rigid segment
98d Fourth rigid segment
100a First pressure surface region
100b Second pressure surface region
100c Third pressure surface region
100d Fourth pressure surface region
100e Fifth pressure surface region
102 Internal pressure
104 Vacuum packaging film
106 Separating film

The invention claimed is:

1. A transmission welding method for welding a first workpiece part, which is formed at least partially from thermoplastic material, to at least one second workpiece part at a weld point, the method comprising:
   providing an infrared lamp within at least one bracing element in a form of a tube;
   a) bracing the first workpiece part and the second workpiece part by at least one bracing element and pressing the at least one bracing element onto the first workpiece part;
   b) directing, using an infrared lamp that is internal to the tube of the at least one bracing element, polychromatic, incoherent infrared light radiation through the at least one bracing element to the first workpiece part and through the first workpiece part to the weld point;

c) setting a temperature of the at least one bracing element before, during, and/or after step b) to influence a temperature of at least one region of the first workpiece part; and moving the tube, with the infrared lamp contained therein, over the first workpiece part along a welding region;

wherein the tube of the at least one bracing element is at least partially transparent to the infrared light radiation;

wherein at least one region of the first workpiece part or all of the first workpiece part is formed from a thermoplastic fiber composite material; and wherein the infrared light radiation is directed through the thermoplastic fiber composite material of the first workpiece part to the weld point.

2. The transmission welding method of claim 1, wherein the at least one bracing element is composed, at a bracing surface defined by the tube, of a flexible material that provides a flexible skin region for bearing against the first workpiece part, such that the at least one bracing element is a flexible bracing element.

3. The transmission welding method of claim 2, wherein the at least one bracing element has at least one fluid medium cavity within the tube that is filled or fillable with a fluid medium; and one or more of:
   the at least one bracing element comprises at least one channel within the tube, the method comprising, in step a) and/or step c), conducting a temperature-controlled fluid medium through the at least one channel;
   in step a) and/or step c), conducting the fluid medium that is transparent or transmissive to the infrared light radiation through the at least one bracing element; and
   in step a) and/or step c), controlling a pressure distribution by controlling a pressure of the fluid medium.

4. The transmission welding method of claim 2, wherein the flexible material comprises silicone or polyimide.

5. The transmission welding method of claim 2, comprising controlling contact pressure of the flexible bracing element by a pressure fluid.

6. The transmission welding method of claim 1, wherein moving the infrared lamp over the first workpiece part along the welding region welds the workpiece parts continuously along the welding region.

7. The transmission welding method of claim 1, wherein, in step a), the at least one bracing element comprises a material selected from the group of materials consisting of a flexible material, a rigid material, glass, transparent plastic, polyimide, vacuum packaging film and silicone, and also combinations of these materials.

8. The transmission welding method of claim 1, comprising one or more of steps of:
   welding the material parts, in each case selected from the group consisting of a fiber-reinforced plastics component, a component with a matrix comprising thermoplastic material, a component with a matrix comprising PPS, a component with a matrix comprising PEKK, a component with a matrix comprising PEEK, a component with a matrix comprising PA, a component with a matrix comprising PEI, a component with a matrix comprising LM PAEK, a component with a matrix comprising PBI, a component with a matrix comprising PE, a component with reinforcement fibers in a form of a woven fabric, a component with reinforcement fibers in a form of a scrim, a component with reinforcement fibers in a form of unidirectional fibers, a component with reinforcement fibers in a form of short fibers, a component with reinforcement fibers in a form of continuous fibers, a component with reinforcement fibers comprising carbon, a component with reinforcement fibers comprising glass, a component with reinforcement fibers comprising continuous carbon fibers, a component with reinforcement fibers comprising continuous glass fibers, a component with reinforcement fibers comprising short carbon or glass fibers, a component with reinforcement fibers comprising aramid fibers, a component with reinforcement fibers comprising silk, a component with reinforcement fibers comprising fibers from a biological source, and a component with reinforcement fibers comprising ceramic; and
   welding the first workpiece part and the second workpiece part with an overlap or partial overlap.

9. A method of using the transmission welding method of claim 1 for:
   generating longitudinal and or circumferential connections on:
      a vehicle or aircraft fuselage;
      a vehicle or aircraft fuselage component; or
      a vehicle or aircraft component;
   welding a frame of a vehicle or aircraft;
   welding a skin to a frame on a vehicle or aircraft;
   welding stringers or formers to a skin of a vehicle or aircraft;
   welding structural components to form an enclosure for a door of a vehicle or aircraft;
   welding floor structures of a vehicle or aircraft; or
   welding coupling elements for coupling structural elements of a vehicle or aircraft.

10. The transmission welding method of claim 1, wherein step a) and/or step c) comprises:
   preheating the at least one bracing element and the first workpiece part to reduce heating time for the transmission welding method; and/or
   post-heating or cooling the at least one bracing element and the first workpiece part to improve workpiece quality or crystallization rate.

11. The transmission welding method of claim 1, wherein the infrared light radiation is generated in a wavelength range from 1.0 to 0 µm.

12. The transmission welding method of claim 1, comprising welding the first workpiece part and the second workpiece part with a butt joint.

13. The transmission welding method of claim 1, comprising introducing an intermediate layer between the workpiece parts before directing the infrared light radiation to the weld point.

14. A method of using the transmission welding method of claim 1 for welding fastening elements, brackets, clamps, or clips to a fuselage structure or skin of a vehicle or aircraft.

15. A transmission welding method for welding a first workpiece part, which is formed at least partially from thermoplastic material, to at least one second workpiece part at a weld point, the method comprising:
   a) bracing the first workpiece part and the second workpiece part by at least one bracing element, wherein:
      the at least one bracing element is rotatable about an axis of rotation;
      the at least one bracing element is roll-shaped, roller-shaped, spherical, or in a form of a rolling body; and
   b) directing polychromatic, incoherent infrared light radiation through the at least one bracing element to the first workpiece part and through the first workpiece part to the weld point; and c) setting a temperature of the at least one bracing element before, during, and/or after step b) to influence a temperature of at least one region of the first workpiece part;

wherein the at least one bracing element is at least partially transparent to the infrared light radiation;

wherein at least one region of the first workpiece part or all of the first workpiece part is formed from a thermoplastic fiber composite material;

wherein the infrared light radiation is directed through the thermoplastic fiber composite material of the first workpiece part to the weld point; and wherein the at least one bracing element comprises multiple rigid segments, which are flexibly articulated to one another, in order to replicate a topology of the first workpiece part.

16. The transmission welding method of claim 15, comprising:

moving the bracing element over the first workpiece part; and/or rolling the at least one bracing element over the first workpiece part.

17. The transmission welding method of claim 15, wherein:

the at least one bracing element is in the form of the rolling body; and the infrared light radiation is generated in an interior of the rolling body.

18. A transmission welding method for welding a first workpiece part, which is formed at least partially from thermoplastic material, to at least one second workpiece part at a weld point, the method comprising:

a) bracing the first workpiece part and the second workpiece part by at least one bracing element, wherein the at least one bracing element comprises an infrared light source that is internal to the at least one bracing element;

b) moving the infrared light source over the first workpiece part to direct polychromatic, incoherent infrared light radiation through the at least one bracing element to the first workpiece part and through the first workpiece part to the weld point along a welding region;

moving the at least one bracing element, along with the infrared light course contained therein, over the first workpiece part, jointly with the infrared light source; and c) setting a temperature of the at least one bracing element before, during, and/or after step b) to influence a temperature of at least one region of the first workpiece part;

wherein the at least one bracing element is at least partially transparent to the infrared light radiation;

wherein at least one region of the first workpiece part or all of the first workpiece part is formed from a thermoplastic fiber composite material; and wherein the infrared light radiation is directed through the thermoplastic fiber composite material of the first workpiece part to the weld point.

* * * * *